United States Patent Office 3,697,333
Patented Oct. 10, 1972

3,697,333
WELDING PASTE FOR RESISTANCE WELDING COPPER PARTS
Albert Hoeffleur, Alte Landstrasse 29,
Kusnacht, Switzerland
No Drawing. Original application May 2, 1968, Ser. No. 730,919, now Patent No. 3,602,682. Divided and this application Oct. 21, 1970, Ser. No. 90,229
Int. Cl. B23k 35/34, 11/18
U.S. Cl. 148—24
1 Claim

ABSTRACT OF THE DISCLOSURE

A welding paste for joing copper parts by resistance welding by coating such parts to be joined at the points prior to welding with the paste containing a mixture of powdered silver solder or powdered silver and a soldering flux.

---

This application is a division of co-pending application Ser. No. 730,919, filed May 2, 1968, now Pat. No. 3,602,682.

The invention relates to welding paste for joining copper parts together by resistance welding.

The welding of copper parts with resistance-welding sets, and spot welding in particular, has hitherto been extremely difficult. Welding copper parts in the normal manner, that is to say by the use of copper electrodes, is not possible, because the electrodes and the parts to be welded together have the same specific resistance, so that the electrodes themselves become welded when that method is employed; nor has the use of electrodes made of precious metals in place of copper electrodes proved satisfactory in this connection.

To overcome these difficulties, one method which has not previously been proposed is to place silver alloy foil between the parts to be welded. For spot welding, however, the piece of foil used needs to be very large in relation to the area of the weld spot, because of the chance of its slipping out of position. When the weld has been made, the edges of foil extending outside the actual weld spot remain loose between the welded faces and cannot usually be removed. Apart from that, it frequently happens in spot welding, when the objects to be welded are fed forward automatically, that the pieces of foil slip so far out of position that none at all is left at the point of the weld. The electrodes thereupon become welded-on, at which point the work must be brought to a halt, fresh electrodes have to be fitted and in many cases, too, the article that is being assembled or the two parts being welded must be rejected because of faulty welding. What the invention sets out to do is to find a welding paste for welding copper parts, and to provide means of putting that method into practice, whereby welding can be carried out simply and satisfactorily with resistance-welding equipment.

This the invention achieves by virtue of the fact that, in work of the kind described, the copper parts to be welded together are coated at the weld points, before welding takes place, with a welding paste containing a mixture of powdered silver solder or powdered silver and a soldering flux.

It is also of advantage for the copper parts that are to be welded to be stuck together with this welding paste prior to welding. To enable this to be done, the welding paste may also contain adhesive ingredients.

The invention includes a means of putting this method into practice, in the form of a welding paste containing a mixture of powdered silver solder or powered silver and a soldering flux.

The invention is described hereunder in detail, with the aid of one or two practical examples. For putting the proposed method into practice, the parts to be welded for instance, the edges of two sheets of copper that require welding, are coated on at least one face with the welding paste, the composition of which may conform to one of the examples given below. For this purpose, it is advisable, in the case of spot welding, to apply the welding paste, in the areas to be welded, over the entire length along which the sheets are to be welded, exactly the same as for stitch or seam welding. Then, if the sheets, or those parts thereof which are to be welded, are pressed firmly together, the welding paste pressed between the two edges that have been brought together for welding acts, because of its adhesion, like a cement, which holds the edges together even before they have been welded. In this way, great accuracy of welding can be obtained. The adhesion of the welding paste can be further enhanced by the addition to it of adhesive ingredients, that is to say ingredients which promote adhesion between the paste and the metal surfaces, such as, for example, poly-iso-butylene, polybutadiene or a polyvinyl ether. A number of other polyvinyl compounds can also be used for this purpose, such as, for instance, polyvinyl acetate and polyvinyl propionate.

At the same time, even if the welding paste contains additional adhesive ingredients, the adhesion between the parts, when these have been pressed together for welding with the welding paste in between, is generally not so great that the parts cannot be separated again before welding, as may be necessary in some circumstances, such as when the parts have been wrongly or inaccurately put together.

The sheets to be welded having thus been brought into contact and pressed together, spot, stitch or seam welding is carried out with the aid of a resistance-welding set. Initially, the welding paste offers a relatively high resistance and the actual current paths lie substantially through the particles of silver solder or powdered silver, which are in contact on both sides with the faces to be welded. As the total conductive cross-section formed by all these particles is relatively small, the silver solder or silver becomes over-heated by Joule effect and melts. The flux is heated at the same time and prepares the surfaces for welding. Since the particle sizes of the silver solder or powdered silver are not uniform, as the largest particles melt together or soften, further smaller particles also come into contact with the faces to be joined and form additional current paths, so that the welding current, initially very small, increases almost continuously during welding and can be cut off when at a maximum value safely below that at which there is a likelihood or possibility of the electrode becoming welded to the parts it is required to join. The current value in question, at which there is a possibility of the electrodes being welded to the parts to be joined, is determined partly by the area of contact between the electrodes and the copper parts and partly by the minimum current density at which welding may be expected to occur. If the welding current be cut off at a maximum level sufficiently below that level to afford a margin of safety, the welding of the eelctrodes to the workpieces can be prevented with absolute certainty. However, the electrodes may also be applied for a given limited period, so short that, even if this maximum current level be exceeded, the electrodes cannot possibly heat up to welding temperature. In that case, this limited period must not greatly exceed that required on average for the welding current to rise continuously, as already described, to the said maximum level. The case in which electrodes may be applied in this way for a limited period arises more particularly in seam welding; but even with spot and stitch welding, this procedure can be followed, that is to say, applying the electrodes for a limited period.

The electrodes to be used for welding copper parts together by the method here proposed may be, of the type normally used in resistance-welding sets, that is to say, as a rule, copper electrodes. The present method makes it possible, for the first time, to join copper to copper with resistance-welding equipment without any difficulty. It can be applied to mass production, in which it results in considerable economy, mainly in the matter of labor costs. A great deal of material can also be saved in this way.

The composition of the welding paste used for this method may conform to one of the following examples:

EXAMPLE 1

40 parts by weight of powdered Lag 45 silver solder, consisting of 45 percent Ag, 18 percent Cu, 20 percent Cd and 17 percent Zn; 60 parts by weight of soldering flux containing 50 percent rosin, 38 percent tallow and 12 percent sal ammoniac.

EXAMPLE 2

50 parts by weight of powdered Lag 12 Cd silver solder, consisting of 12 percent Ag, 45 percent Cu, 7 percent Cd and 36 percent Zn; 50 parts by weight of soldering flux containing 45 percent rosin, 45 percent tallow and 10 percent sal ammoniac.

EXAMPLE 3

25 parts by weight of powdered silver; 75 parts by weight of soldering flux containing 55 percent rosin, 30 percent tallow and 15 percent sal ammoniac.

In each of these examples, up to 20% of the soldering flux ingredient may be replaced by an adhesive such as described in the foregoing. In particular cases, this percentage may even exceed 20%.

The adhesive ingredients may be one of the before mentioned specified adhesive ingredients or a composition of more than one of these ingredients, and that advantageously polyisobutylene may be used.

I claim:

1. A welding paste for resistance welding copper parts by means of copper electrodes, the paste containing a substance selected from the group consisting of powdered silver and powdered silver solder composed of silver, copper, cadmium and zinc, the paste containing further a soldering flux consisting of rosin, tallow and sal ammoniac and further an ingredient having adhesive properties selected from the group consisting of polyisobutylene, polybutadiene, polyvinyl ether, polyvinyl acetate and polyvinyl propionate.

References Cited

UNITED STATES PATENTS

| | | | |
|---|---|---|---|
| 3,033,713 | 5/1962 | Bielenberg et al. | 148—23 |
| 804,664 | 11/1905 | Leisel | 148—24 |
| 2,908,072 | 10/1959 | Johnson | 117—22 X |
| 3,471,310 | 10/1969 | Joseph et al. | 148—23 |
| 1,785,173 | 12/1930 | Barrett | 148—23 |
| 812,494 | 2/1906 | Hussey | 148—24 X |

GEORGE T. OZAKI, Primary Examiner

U.S. Cl. X.R.

148—23, 25